United States Patent
Lee et al.

(10) Patent No.: US 9,402,160 B2
(45) Date of Patent: Jul. 26, 2016

(54) METHODOLOGY TO EXTEND BATTERY POWER IN ASSET-TRACKING DEVICE

(71) Applicant: Senaya, Inc., Framingham, MA (US)

(72) Inventors: Brian Lee, Boston, MA (US); Mrinmoy Chakroborty, Kaggadasapura, Bangalore (IN); Jamshed Dubash, Shrewsbury, MA (US); Jahangir Nakra, Titusville, NJ (US)

(73) Assignee: Senaya, Inc., Boston, MA (US)

( * ) Notice: Subject to any disclaimer, the term of this patent is extended or adjusted under 35 U.S.C. 154(b) by 0 days.

(21) Appl. No.: 14/140,330

(22) Filed: Dec. 24, 2013

(65) Prior Publication Data

US 2014/0187261 A1    Jul. 3, 2014

Related U.S. Application Data

(60) Provisional application No. 61/747,740, filed on Dec. 31, 2012.

(51) Int. Cl.
| | |
|---|---|
| *H04W 4/02* | (2009.01) |
| *H04W 64/00* | (2009.01) |
| *G01S 15/06* | (2006.01) |
| *G01S 5/02* | (2010.01) |
| *H04W 52/02* | (2009.01) |
| *G01S 19/34* | (2010.01) |
| *G01S 5/00* | (2006.01) |

(52) U.S. Cl.
CPC ............. *H04W 4/028* (2013.01); *G01S 5/0027* (2013.01); *G01S 19/34* (2013.01); *H04W 52/0261* (2013.01); *H04W 64/00* (2013.01)

(58) Field of Classification Search
CPC ....... H04W 4/005; H04W 4/02; H04W 12/08; H04W 12/12; H04W 4/00; H04W 4/04; H04W 4/08; H04W 4/20; H04W 88/06; H04W 8/22; H04W 4/025; H04W 4/028; G01S 19/34; G01S 19/42; G01S 5/0027; G01S 5/0036

USPC .......... 455/456.1, 410, 420, 518, 556.1, 56.1, 455/456.5, 561; 370/328, 412
See application file for complete search history.

(56) References Cited

U.S. PATENT DOCUMENTS

| | | | |
|---|---|---|---|
| 6,067,044 A | 5/2000 | Whelan et al. | |
| 6,700,493 B1 | 3/2004 | Robinson | |
| 6,857,016 B1* | 2/2005 | Motoyama | H04L 69/329 709/206 |
| 6,952,181 B2 | 10/2005 | Karr et al. | |
| 7,072,668 B2 | 7/2006 | Chou | |
| 7,171,187 B2* | 1/2007 | Haave | B60R 25/102 340/686.1 |
| 7,196,621 B2 | 3/2007 | Kochis | |
| 7,218,227 B2 | 5/2007 | Davis et al. | |
| 7,265,668 B1 | 9/2007 | Brosius | |
| 8,150,420 B2 | 4/2012 | Sun et al. | |
| 2005/0174235 A1* | 8/2005 | Davis | G06Q 10/08 340/539.13 |
| 2008/0191867 A1* | 8/2008 | Markovich | G07C 9/00912 340/539.13 |
| 2013/0015947 A1* | 1/2013 | Best | G01S 19/14 340/5.7 |

OTHER PUBLICATIONS

U.S. Appl. No. 13/796,574 (Chakraborty et al.) filed Mar. 12, 2013.
U.S. Appl. No. 13/796,683 (Lee et al.) filed Mar. 12, 2013.
U.S. Appl. No. 13/845,802 (Lee et al.) filed Mar. 18, 2013.
U.S. Appl. No. 13/906,804 (Lee et al.) filed May 31, 2013.

* cited by examiner

*Primary Examiner* — Inder Mehra
(74) *Attorney, Agent, or Firm* — HolzerIPLaw, PC

(57) ABSTRACT

A protocol and methodology that extends the battery power in a remote asset tracking device by storing location data more than once (i.e., "n" times), yet transmitting that data only once to a server. In other words, multiple data points are transmitted simultaneously. Devices and systems incorporating the protocol are also provided.

9 Claims, 3 Drawing Sheets

METHODOLOGY TO EXTEND BATTERY POWER IN ASSET-TRACKING DEVICE

CROSS-REFERENCE TO RELATED APPLICATION

This application claims the benefit of U.S. Provisional Application No. 61/747,740 filed Dec. 31, 2012, the entire contents of which are incorporated herein by reference for all purposes.

BACKGROUND

Assets and products move through different paths and supply chains during the course of their lifetime. There is a desire to track these assets and products owing to their value or for business justification purposes. The asset-tracking device or system therefore becomes an important feature in solving this problem. The tracking device uses established wireless communication mechanisms to identify its location and convey that information back to the user.

Various patent references are directed to remote asset tracking devices. These include, for example: U.S. Pat. No. 6,067,044 "Remote tracking and sensing system and method", U.S. Pat. No. 6,700,493 "Method, apparatus and system for tracking, locating and monitoring an object or individual", U.S. Pat. No. 7,072,668 "Durable global asset-tracking device and a method of using the same", U.S. Pat. No. 7,265,668 "System and method for asset tracking and monitoring", U.S. Pat. No. 7,218,227 "Tracking system and associated method", U.S. Pat. No. 7,196,621 "Tracking system and associated method", U.S. Pat. No. 7,171,187 "Method and system for asset tracking", U.S. Pat. No. 8,078,139 "Wireless data communications network system for tracking container", U.S. Pat. No. 8,150,420 "Mobile station assisted location based service" and U.S. Pat. No. 6,952,181 "Locating a mobile station using a plurality of wireless networks and applications therefor".

However, fetching data or pinging of the data to a remote host is power consuming mechanism and can quickly draining the battery. The present invention provides a system with improved features.

SUMMARY

The present disclosure provides a tracking methodology that extends the battery power in a remote asset tracking device by storing data more than once (i.e., "n" times), yet transmitting that data only once. In other words, multiple data points are saved and then transmitted simultaneously.

One particular embodiment of this disclosure is a data protocol or methodology for a wireless device that includes activities of determining a first location of a device and saving the determined first location of the device, determining a second location of the device subsequent to the first location and saving the determined second location of the device, transmitting the first location and the second location to a server, mapping the second location, after mapping the second location mapping the first location, and reporting the mapped second location and the mapped first location.

Another particular embodiment of this disclosure is a data protocol for a wireless device that includes sequentially determining "n" number of locations of a device and saving those "n" number of locations of the device (where "n" is two or greater), transmitting the "n" number of locations to a server, reverse mapping the "n" number of locations, and reporting the mapped locations.

And yet another particular embodiment of disclosure is an asset tracking system comprising a wireless tracking device comprising a GPS/GLONASS system, an RF communication module or a cellular communication module configured to transmit information to a remote server, non-volatile memory, and a control system comprising a data protocol, and an asset intelligence (AI) server, where the protocol configured to determine "n" locations of the device and store those "n" locations in the memory, and transmit the stored "n" locations to the AI server as a batch.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DISCUSSION OF THE INVENTION

Figure 1:
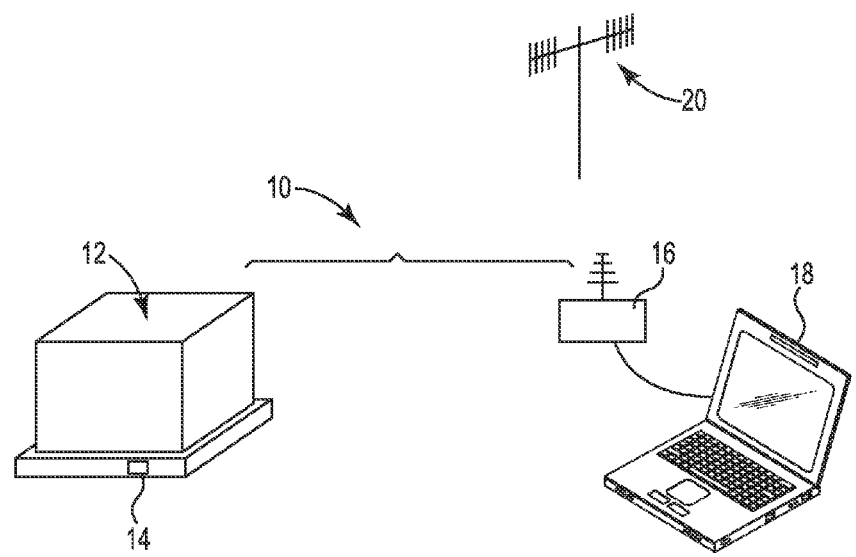
FIG. 1 is a schematic diagram of a wireless tracking system including a tracking device and a receiver.

As indicated above, the present disclosure provides a method and apparatus to extend the battery power in a remote asset tracking device by utilizing a technique that stores more than once (i.e., "n" times), yet transmits only once.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Prior to the invention of this disclosure, location-positioning data was transmitted by the tracking device to the receiver every time the asset-tracking device encountered a data transmission event or ping event. Each cycle of data calculation and transmission uses a small amount of power, thus over time, draining the battery.

The expectation in the use of these devices is to have autonomous operation for extended periods of time. The impact of reduced battery life includes more frequent maintenance cycles, increased operational expenses, and potential loss of the asset if the battery is weak or dies, resulting in the loss of communication with the asset. Hence, it is desired to use the battery life optimally by pinging when it matters most, especially during a critical business event in the field. To mitigate these concerns, there is a need to optimize value per ping, and effectively increasing battery life.

The devices of this invention maintain battery life much longer than prior location-positioning calculations and the devices. The technique of this disclosure decreases the number of data transmissions while retaining the high level of position accuracy. The technique of this disclosure also increases the number of obtainable pings per battery life and decreases the maintenance cost associated with battery upkeep. The effectiveness of the device in turn to track and locate the assets is impacted by the life of the battery that provides it with energy to perform its function.

This 'store "n" times, transmit once' (aka, "SnT") technique is an integrated solution that simultaneously decreases computing cycles and saves computing power during the process of locating the position of the tracked asset. This technique is integrated in the hardware, firmware and software of the asset-tracking device. The SnT technique can provide 20-30% or more power savings resulting in longer battery life than previous tracking devices, an increased number of pings per battery, and lower battery maintenance and thus lower upkeep cost.

In this technique, multiple cellular events and locations associated with the event are stored in a non-volatile memory of the asset-tracking device as a data packet. This data packet is then transmitted to a receiver, such as an asset intelligence (AI) server, after the predetermined events have occurred. The length of this data package is configurable by the user as desired, for example, when the device is associated with (e.g., attached to) the asset or during implementation, such as by Over-the-air (OTA) commands. The number of events ("n") for which the steps are stored is a trade-off between power savings and desired ping interval.

FIG. 1 illustrates a generic tracking system for use with the SnT technique. A "tracking system" and variations thereof includes at least one tracking or transmitter device, and a receiver for receiving the location signal from the tracking transmitter device(s). A "tracking device," "transmitter device," and variations thereof is a portable, signal emitting device configured for placement in or on an asset to be tracked, such as a container of goods, the device including non-volatile memory. FIG. 1 illustrates a tracking system 10 having a transmitter device 14 associated with (e.g., located on) an asset 12. Transmitter device 14 is an active RF tag, having the capability to actively transmit and/or provide interactive information to a receiver 16, located remote from asset 12 and transmitter device 14. Receiver 16 is operably connected to a computer, server, or display 18. System 10 uses an established wireless communication network 20 to identify the location of transmitter device 14 and convey that information to display 18. Examples of wireless RF communication networks 20 with which system 10 can function include CDMA/GMS, ZigBee, (Low Energy) BlueTooth (LBT), WiFi (sometimes referred to as WLAN), LTE, and WiMax.

Figure 2:
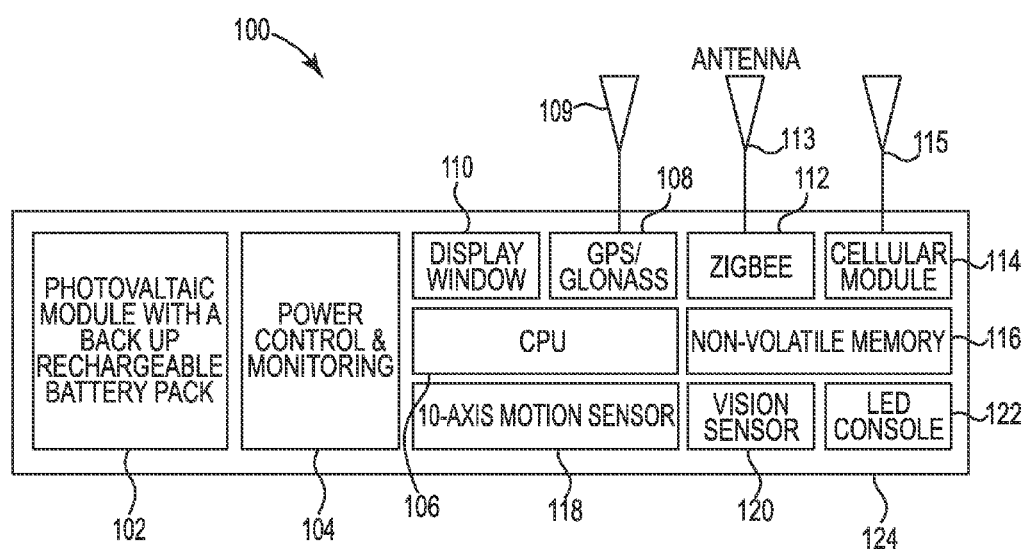
FIG. 2 is a schematic block diagram of a wireless tracking device.

A particular embodiment of a tracking device (such as tracking device 14 of FIG. 1) is illustrated in FIG. 2. Tracking or transmitter device 100 of FIG. 2, together with a receiver (e.g., receiver 16 of FIG. 1), forms a tracking system (e.g., system 10 of FIG. 1). FIG. 2 and the following discussion are directed to one particular wireless tracking device. It is understood that other configurations and designs of the tracking device may be used in conjunction with the SnT technique of this disclosure.

Device 100 includes a power source 102, which may be a single use battery or a rechargeable battery. Examples of suitable batteries include NiCad, lithium, lithium-ion, zinc-carbon, and alkaline batteries. For example, a 3.7V battery could be used, although it is understood that other voltage batteries could be used. In FIG. 1, power source 102, which can be a photovoltaic module and optionally include a rechargeable battery pack. Other power source rechargers or regenerators could be utilized, such as an inductive coil, a USB power-line, and mechanical energy harvesting mechanisms.

Electrically connected to power source 102 is a power control module 104 that includes a power level (e.g., battery level) monitor and a power control, which in turn is operably connected to a computer chip or CPU 106. Present within CPU 106 is appropriate circuitry and programming to implement the SnT technique with device 100. Together CPU 106 and power module 104 activate and deactivate various elements of device 100, for example, based on the stored and not-yet-sent data points, and based on physical location of device 100.

Transmitter device 100 also includes a positioning element, in this embodiment a GPS/GLONASS positioning element 108 connected to an antenna 109, which may be an internal antenna or an external antenna, and may be embedded into a housing encasing the elements of device 100. Antenna 109 may be, for example, a planar inverted F antenna, an inverted L antenna, or a monopole antenna. Antenna 109 may be a multi-band antenna, one that can transmit and receive signals in multiple frequency bands. In other embodiments, the positioning element may include mobile station-assisted (MSA) operation to enable accurate positioning at locations where GPS/GLONASS is unavailable or impaired. Positioning element 108 provides data to transmitter device 100 regarding its physical location.

Transmitter device 100 transmits information or data, such as its location, in the form of a "ping" to the remote receiver (e.g., receiver 18 of FIG. 1) via a wireless network; the information or data may also be provided to a display 110 on device 100. In some embodiments, transmitter device 100 has two-way communication with the receiver. That is, transmitter device 100 transmits information (i.e., a ping) and also receives information from the receiver. Further, transmitter device 100 may receive instructions, such as to acknowledge that device 100 is active and ready and to transmit the location information. Having received those instructions, device 100 can send back to the receiver acknowledgement that the communication was received and acted on.

As indicated, the transmitter device is configured to send and optionally receive data via a wireless network. Device 100 of FIG. 2 is configured with a ZigBee module 112 to connect to the receiver via a ZigBee network and communicate data (e.g., position data). An alternate embodiment of a transmitter device can utilize a ZigBee/LBT module and a corresponding ZigBee/LBT network. Additionally, transmitter device 100 may include a data receiver (not shown), such as an infra red data link (IrDA), to provide a second communication means to device 100, as an alternate or back-up to module 112. Device 100 also includes a cellular communication module 114, which may be CDMA (Code Divisional Multiple Access) and/or GSM (Global System for Mobile Communication) module, configured to connect to the receiver via either a CDMA or GSM network and communicate data to the receiver.

Communication modules 112, 114, respectively, have an antenna 113, 115 which may optionally include a power amplifier to extend the range of the signal from modules 112, 114. In some embodiments, modules 112, 114 may be combined into a single physical module rather than two separate or distinct modules. Together, modules 112, 114 provide the communication basis for transmitter device 100 to the receiver. Module 112, which connects device 100 a wireless RF network, can be utilized when regulations allow use of RF communications, and module 114, which connects device 100 to a cellular network, can be utilized, for example, in situations when regulations do not allow the use of RF communications yet do allow cellular communications.

Any of the data or information regarding device 100, such as its position as determined by positioning element 108, alarm information, battery level information, etc., can be stored in a memory 116 of device 100, which may be a permanent memory or a rewritable memory. In accordance with the SnT technique, multiple data points are stored in memory 116 and sent to the receiver as a batch.

Transmitter device 100 includes a motion sensor array 118 and a vision sensor 120 to determine the orientation, location and/or movement of device 100. Motion sensor array 118 is shown as a 10-degree of freedom (DOF) device that includes a 3-axis gyroscope, 3-axis accelerometer, 3-axis magnetometer, and an altitude sensor. Other embodiments of motion sensor array 118 may be used; for example, a three degree of freedom (DOF) device having a 3-axis accelerometer or a six degree of freedom (DOF) device having a 3-axis gyroscope and a 3-axis accelerometer. Another example of s suitable configuration for motion sensor 118 includes a 9-DOF device that includes a 3-axis gyroscope, a 3-axis accelerometer and a 3-axis magnetometer. By sensing the various multiple degrees of freedom, device 100 can distinguish among various movements, orientations and locations, such as lateral motion, acceleration, inclined or declined motion, and altitude.

Device 100 may also include an indicator console 122 having various operational switches, gauges, buttons, and/or lights (e.g., LED lights). Console 122 may include any number of optional features, such as an audio alarm to indicate any number of problems or malfunctions, such as low battery level, unauthorized movement (as sensed by motion sensor array 118 and/or vision sensor 120), or tampering with device 100.

The various elements that compose transmitter device 100 may be housed in an RF and/or cellular transmissive enclosure or housing 124, preferably one that is at least water resistant. At least a portion of housing 124 may be transmissive or transparent to RF and/or to visible light.

As indicated, present within CPU 106 is appropriate circuitry and programming to implement the SnT technique with device 100.

Device 100 typically has an initializing state that includes a reset state, a data or ping state, and an idle state. First, the device is in reset state. After the device is reset, the device will attempt to send a ping to a host (e.g., receiver 16 of FIG. 1) identifying that the device is alive and to determine its location.

Figure 3:
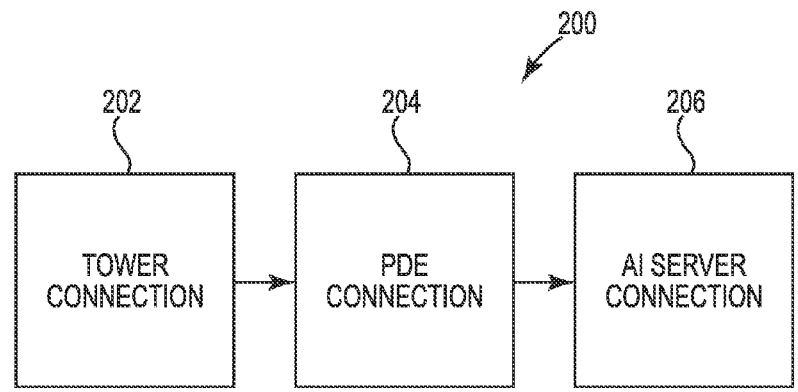
FIG. 3 is a block diagram of operation cycles for mobile station-assisted operation.

The location of the device can be determined by GPS/GLONASS with or without mobile station assistance (MSA). FIG. 3 illustrates a typical three-step, location positioning process 200, utilizing a cell tower connection 202, a position determination entity (PDE) server connection 204, and an asset intelligence (AI) server connection 206. Typically, each cycle takes 8-12 seconds and consumes no more than 500 mA, typically 200-500 mA. In total, it generally takes 25-40 seconds to transmit data from the device to the AI server and the device consumes no more than 1500 mA, generally no more than 1000 mA and typically 500-1500 mA.

Figure 4:
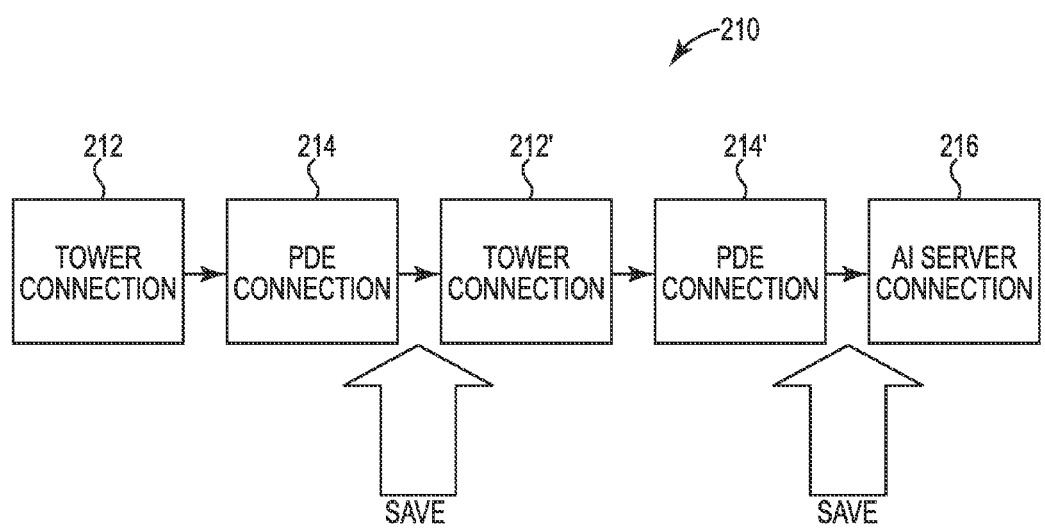
FIG. 4 is a block diagram of operation cycles for a technique of the invention of this disclosure.

Because each one of these steps consumes computing power and affects battery life, the SnT technique reduces the cycle steps, effectively increasing battery life. In the SnT technique however, the data collected in the first two steps (i.e., cell tower connection 202 and PDE server connection 204) in the location-positioning process 200 is stored in non-volatile memory (e.g., non-volatile memory 116 of FIG. 2) rather than being sent via server connection 206. FIG. 4 illustrates the SnT technique, which has reduced server connection steps. The SnT location positioning process 210 includes a first cell tower connection 212, a first position determination entity (PDE) server connection 214, a second cell tower connection 212', a second position determination entity (PDE) server connection 214'. Only after these multiple connections 212, 214 and 212', 214', and any subsequent connections (not illustrated), is the server connection 216 made. FIG. 4 illustrates two cycles being saved and sent to the AI server as a batch, whereas in other embodiments, the number of cycles can be any number two or greater, such as three, four or more cycles that are saved and sent to the AI server as a batch.

In the asset tracking device and system of this invention, the ping event, determined by either event-based or time-based ping information, together with the associated location of the ping event, are stored in the non-volatile memory. The number of these stored ping cycles or events is configurable by the user, such as by over-the-air (OTA), and can be adjusted for each asset-tracking device individually. The number of events for which the steps are stored is a trade-off between power savings and desired ping interval. The number of stored events ("n") can be preselected and permanently set, or may be varied depending on the tracking environment and/or situation.

During use, after the predetermined "n" number of events has been saved in the memory of the asset tracking device, the tracking device will send the stored information to the AI server. The data from multiple events are transmitted to the AI server as a tandem operation. That is, the data is sent in the AI server in a stack and the AI server processes the data in a LIFO (Last-in-First-out) manner. After the AI server receives the data, it run a business analytics engine, for example, that correlates the lumped field events, integrates transaction events with location information, and runs statistical algorithm(s) to arrive at a more precise location determination of the asset. All this is accomplished with a power savings over conventional systems that send data for every event, the power savings being, for example, 20-30%.

Figure 5:
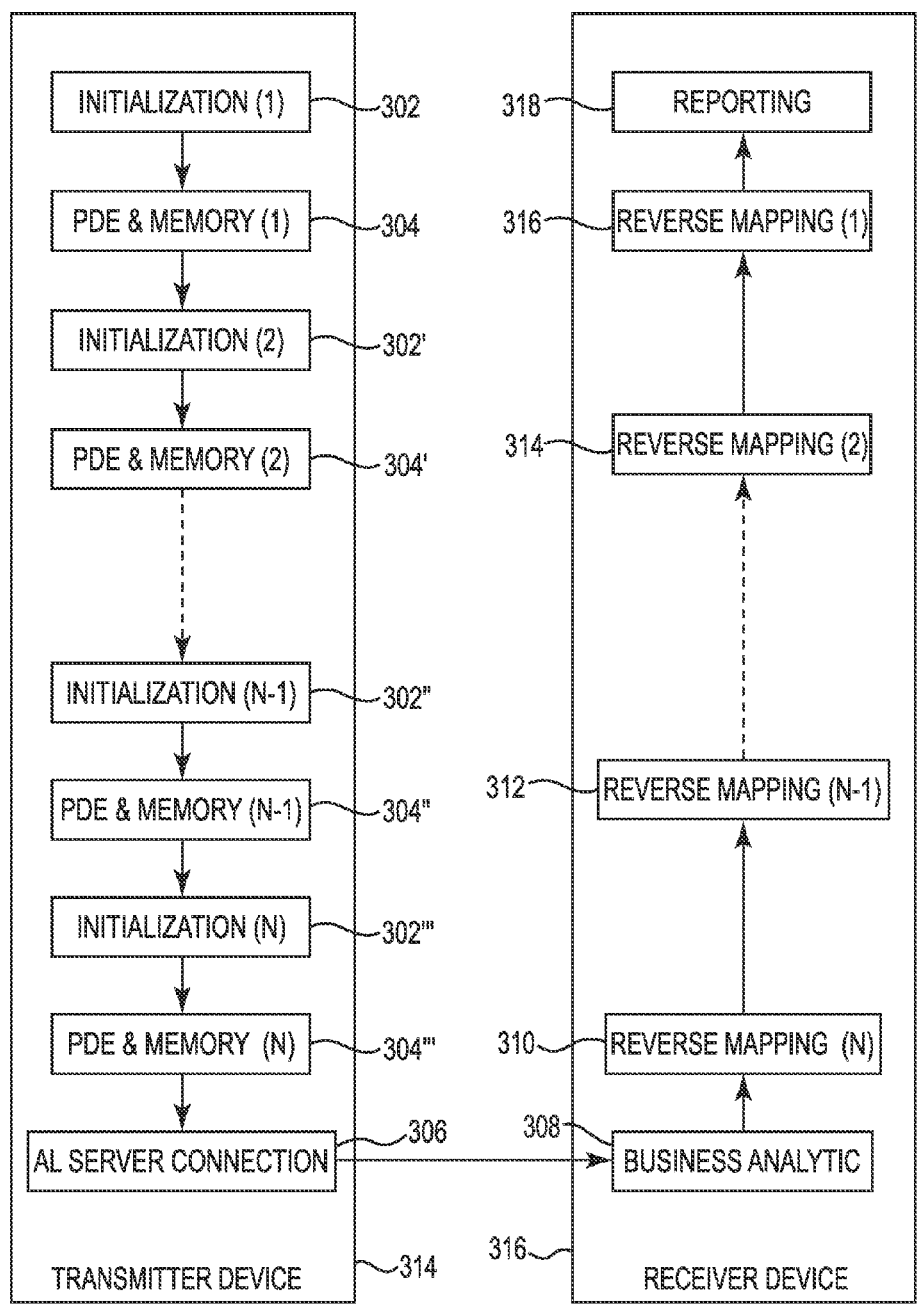
FIG. 5 is a block diagram for a technique of the invention of this disclosure at a receiver.

FIG. 5 illustrates an embodiment of a flow chart for steps for the SnT technique. This process 300 shows a first cycle having an initialization step 302 and a combined PDE connection and memory step 304 and a second cycle having an initialization step 302' and a combined PDE connection and memory step 304'. Process 300 also includes a third initialization step 302" and a third combined PDE connection and memory step 304" and fourth initialization step 302'" and a fourth combined PDE connection and memory step 304'". After these four cycles, the data from these events is sent to AI server at step 306 (AI server connection). These cycles takes place in the transmitter device 14. In this process 300, "n" (the number of stored events) is four, whereas in other embodiments the process may have only two or three stored events, or may have five or more stored events, after which the events are sent to the AI server.

Once the ping by received in or by receiver device 16, that data goes to the AI server. Here, the process is reversed based on LIFO (Last-in-First-out) protocol. In a business analytic step, from these stored ping cycles or events, the asset location is recalculated based on stacked data, transaction events are correlated with location information, and statistical algorithm(s) are runs to arrive at a more precise location determination of the asset.

In the illustrated FIG. 5, the fourth or "nth" PDE data is mapped first at step 310, the third PDE data is mapped second at step 312, the second PDE data is mapped third at step 314, and the first PDE data is mapped last, at step 316. After all the data has been processed, it is reported via step 316, for example, to display 18 of FIG. 1.

This SnT technique can be implemented through an integration of hardware, firmware and software to optimize both power consumption and location accuracy. As indicated above, the data collection or ping event can be event-based or time-based, or any other protocol. Examples of various event based protocols, identified as SMART Ping™ events, such as described in U.S. patent application Ser. No. 13/796,574 filed Mar. 12, 2013 titled "Asset Tracking System with Adjusted Ping Rate and Ping Period," U.S. patent application Ser. No. 13/796,683 filed Mar. 12, 2013 titled "Asset Tracking System with Data Ping Based on Asset Movement," U.S. patent application Ser. No. 13/845,802 filed Mar. 18, 2013 titled "Asset Tracking System Activated by Predetermined Pattern of Asset Movement," and U.S. patent application Ser. No. 13/906,773 filed May 31, 2013 titled "Wireless Device with Hybrid Energy Charging," all which are incorporated herein by reference in their entirety, can further be used to optimize both power consumption.

Thus, various embodiments of the METHODOLOGY TO EXTEND BATTERY POWER IN ASSET-TRACKING DEVICE are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of using a data protocol for a wireless device, the data protocol comprising:
   determining a first location of the wireless device and saving the determined first location of the device;
   determining a second location of the device subsequent to determining the first location and saving the determined second location of the device;
   transmitting a data packet comprising the first location and the second location to a server;
   mapping, at the server, the second location;
   after mapping the second location, mapping, at the server, the first location;
   running, at the server, a statistical algorithm on the mapped first location and the mapped second location to determine a precise location; and
   reporting, by the server, the precise location.

2. The protocol of claim 1 further comprising:
   determining a third location of the device subsequent to the second location and saving the determined third location of the device; and
   transmitting the data packet comprising the first location, the second location and the third location to the server;
   mapping, at the server, the third location before mapping the second location;
   running, at the server, the statistical algorithm on the mapped first location, the mapped second location and the mapped third location to determine the precise location; and
   reporting, by the server, the precise location.

3. A method of using a data protocol for a wireless device, the data protocol comprising:
   sequentially determining "n" number of locations of a device and saving the "n" number of locations of the device in a data packet, where "n" is an integer two or greater;
   transmitting the data packet to a server;
   mapping, at the server in a reverse order of determining, the "n" number of locations from the data packet;
   reporting, by the server, the "n" mapped locations; and
   running, at the server, a statistical algorithm on the "n" mapped locations to determine a precise location.

4. The protocol of claim 3 wherein "n" is three.

5. The protocol of claim 3 wherein "n" is four.

6. The protocol of claim 3 wherein "n" is two.

7. An asset tracking system comprising:
   a wireless tracking device comprising a GPS/GLONASS system, an RF communication module or a cellular communication module configured to transmit information to a remote server, non-volatile memory, and a control system comprising a data protocol; and
   an asset intelligence (AI) server;
   wherein the data protocol is configured to:
      determine "n" locations of the device and store those "n" locations in the memory,
      where "n" is an integer two or greater, and
      transmit the stored "n" locations to the AI server as a batch;
   wherein the AI server is configured to:
      map, in a reverse order of determining, the "n" number of locations from the data packet, and
      run a statistical algorithm on the "n" mapped locations to determine a precise location.

8. The asset tracking system of claim 7 further comprising a display to report the precise location.

9. The asset tracking system of claim 7 further comprising a mobile station assistance (MSA) system.

* * * * *